United States Patent [19]

Schorsch

[11] 4,236,145
[45] Nov. 25, 1980

[54] ELECTRONIC INTERVAL TIMING DEVICE

[75] Inventor: Ronald W. Schorsch, Federal Way, Wash.

[73] Assignee: Service Computers, Inc., Seattle, Wash.

[21] Appl. No.: 67,441

[22] Filed: Aug. 20, 1979

[51] Int. Cl.³ .............................................. G08B 5/38
[52] U.S. Cl. ............................ 340/309.1; 340/309.4; 340/52 D
[58] Field of Search ..................... 340/309.1, 636, 654, 340/644, 52 D, 309.4; 324/182

[56] References Cited
U.S. PATENT DOCUMENTS 4,134,101  1/1979  Jones ................................. 340/52 D

*Primary Examiner*—Harold I. Pitts
*Attorney, Agent, or Firm*—Cole, Jensen & Puntigam

[57] ABSTRACT

Reversible, elapse-time indicator utilizing two solid electrolyte cells in which current of one polarity is applied to one cell to cause silver ions to move from the positive electrode to the negative electrode. When all the ions have been removed from the positive electrode after a predetermined specific interval of time, the cell resistance increases to trigger an alarm such as a lamp. While the first cell is timing out, the second cell is being charged from a zero time value by a current of an opposite polarity equal to the time begun within the first cell. When the time interval has elapsed, the cells are reversed so that the second cell now becomes the timing device and the first cell is being recharged.

14 Claims, 2 Drawing Figures

ELECTRONIC INTERVAL TIMING DEVICE

BACKGROUND OF THE INVENTION

The instant invention relates to electrolytic timers and more particularly to an electronic timer circuit which utilizes a solid electrolytic timing device for measuring a predetermined, elapsed time period.

Numerous electronic timers have been produced which indicate lengthy time periods, as for instance, time periods in excess of several hundred hours. One of the problems with prior timing devices has been accuracy of measurement within a reasonable or permissible percent of total elapse time without employing more complicated and expensive electromechanical clock mechanisms.

Electrolytic timer devices have been employed in the past, but the use of electrolyte solutions requires manufacturing techniques that assure long shelf-life and operation without leaking, changing their physical and performance dimensions or creating operating hazards. Electroplating techniques have been used for inexpensive timers in the past to indicate elapsed time by visual observation of a deposit. However, determining the elapsed time period is inconvenient and as might be appreciated quite inaccurate. If a mechanical timer device is used in a circuit, a switching mechanism is required and this adds to the expense of the timer. So-called "one-shot" timers are known but must be thrown away after the period for which they are designed has elapsed.

The only prior art of which applicant is aware and which is related to the invention herein are disclosed in U.S. Pat. Nos. 3,355,731 and 3,769,557.

SUMMARY OF THE INVENTION

Reversible and reusable solid state electronic timing mechanism for signaling the lapse or expiration of a predetermined time period.

The circuit utilizes a double timing cell assembly consisting of two solid electrolyte cells and a cell holder. The timing interval may be repeated by simply reversing the polarity of the timing cells after the lapse of each timing interval. Each cell includes two electrodes separated by an ionic conducting solid electrolyte compound with silver deposited upon one electrode. When current of proper polarity is applied to the cell, metallic ions move from the positive electrode into the electrolyte and to the negative electrode. The circuit enables the non-timing cell to be charged by the electronic circuit to a level equal to the first time interval.

Accordingly, it is among the many features, advantages and objects of the invention to provide a solid state electronic timing mechanism which has many potential uses as an electronic timer particularly in functions where only reasonably accurate time measurement is required. The device is inexpensive and can be used to indicate the need for servicing an automobile or other equipment after the lapse of a certain number of operating hours. The number of uses and the various timing functions in which the device may be employed are numerous. The device automatically lights a lamp after a prescribed number of operating hours has expired. The device is one hundred percent solid state and provides long life and high reliability. The timing circuits are such that they may be easily mounted in a small case which has a readerboard lighted by the lamp upon the expiration of the predetermined time period to indicate expiration of the time period.

DESCRIPTION OF PREFERRED EMBODIMENT

The timing circuit of this invention measures intervals of time which may vary from zero to three thousand hours. The component which makes this solid state timer possible is the Coulocom cell which is a dry electro-chemical device consisting of two electrodes separated by an ionic conducting solid electrolyte compound with silver deposited upon one electrode. When voltage of proper polarity is applied to the cell, an electrical current flows through the cell. This current causes silver ions to move from the positive electrode, into the electrolyte, and eventually to be deposited on the negative electrode. So long as there are ions in the electrolyte, the electrolyte offers very low resistance to current flow, and therefore, very low voltage drop across the cell. When all of the silver ions are removed from the positive electrode and electrolyte, the resistance across the cell increases causing a larger voltage drop across the cell. This voltage rise is sensed by the electronic circuit to turn on the lamp which indicates that a specific time interval has lapsed. The timing interval is determined by the "charge quantity", that is the amount of silver material available for transfer and the current through the cell. Thus, with a known quantity of material and by control of the current, the cell will time a specific time interval or period. The time interval can be varied by changing either the "charge", that is the amount of metallic material deposited on the positive electrode, or the current through the cell which is controlled by the resistor in series with the cell. Current increases as resistance is decreased and vice versa.

In this device, the timing cell assembly consists of two Coulocom cells. One cell has a specific charge on the positive electrode corresponding to a specific time interval. The other cell has no charge. As the first cell begins timing the first time interval, the second cell is being charged by the electronic circuit to a level equal to the first cell's specific charge/time interval. It will be appreciated that by reversing the timing cell polarity, the timer's function of timing an interval and at the same time charging the idle cell may be repeated indefinitely.

Figure 1:
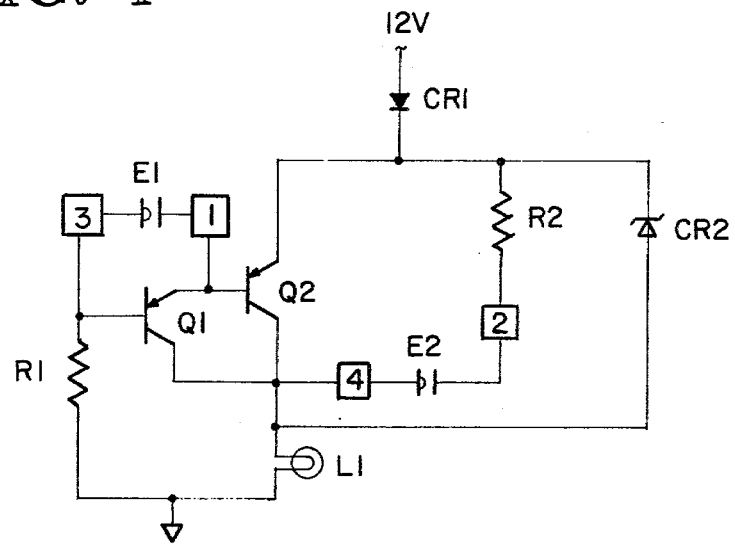
FIG. 1 is a schematic of a timer circuit in which the two solid state electrolyte cells are reversed in the circuit by using four, socket type connector positions in the circuit.

In FIG. 1 a twelve volt power source is connected to diode CR1 which is used to assure that the electronics cannot be damaged by incorrect installation, that is by accidentally installing the timer backwards. Diode CR1 also stops any negative spikes in the power supply. A timing cell E1 is connected to connector receptacles 1 and 3 on each side of the cell and is the active or timing cell in the circuit. During the timing interval there is approximately 0.000015 (15 microamps) flowing through resistor R1 and cell E1. Two transistors Q1 and Q2 are connected in darlington with the base of Q1 being connected to the junction of resistance R1 and cell E1. The other side of the cell is connected via receptacle or connector 1 to the junction of the collector of Q1 and the base of Q2. With the 15 microamps flowing through R1, the voltage at the base of Q1 is sufficient to hold Q1 in the nonconducting state. During this time, cell E2 having connector receptacles 2 and 4 is being charged through resistor R2 and lamp L1. When cell E1 times out, its resistance increases causing the voltage at the base of Q1 to rise until Q1 starts to conduct. This enables Q2 to conduct causing lamp L1 to light and thus terminating the charge to cell E2. The lamp, when lighted, requires approximately 0.100 amps (100 milli-amps) of current which is supplied through diode CR1 and darlington transistors Q1 and Q2. The current gain of Q1 and Q2 is greater than 6,000 to 1. Zener diode CR2 provides protection against high voltage spikes which can occur in some vehicle electrical systems. After timing out, the cell assembly is removed and cell E2 then takes the place of E1 between connectors 1 and 3 and E1 replaces E2 between receptacles 2 and 4.

Figure 2:
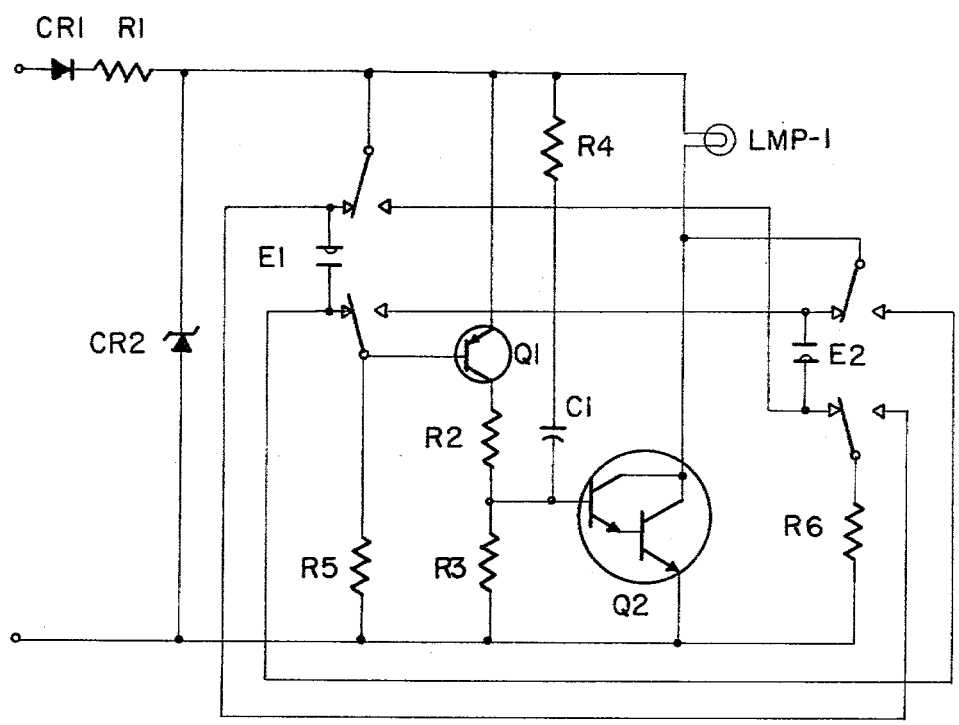
FIG. 2 is a similar circuit in which a switch is used to reverse the timing action.

In FIG. 2, the timing unit functions in virtually the same manner as the circuit in FIG. 1. In this embodiment, however, the cells are reversed in the circuit by a four pole double throw switch instead of being physically removed and turned around as in the embodiment of FIG. 1. Resistor R4 and capacitor C1 in conjunction with the high gain darlington transistor Q2 cause the "service required" lamp to light when power is first applied to the unit. Resistor R1 in series with diode CR1 serves as a current limiting device and also functions as a load dropping resistor for the high voltage transients that are by-passed through zener diode CR2.

It will be appreciated that other types of detecting means may be utilized in place of the darlington transistors such as high gain transistors or operating amplifiers. It is not necessary, of course, that the alarm be only visual since it is also possible to use an audible alarm or relay output. Rectified AC line voltage may be used and metallic ion exchange media such as gold may be substituted for silver. Those skilled in the art will also appreciate that a more accurately regulated current source may be employed in place of the resistance regulated battery current shown. There are other components such as a solid state M.O.S. or F.E.T. switch which can be incorporated in place of the four pole, double throw switch in FIG. 2.

What is claimed is:
1. An elapsed-time reminder circuit, comprising:
 (a) a pair of electrolytic timing cells, each having first and second operating states, said timing cells having a relatively low resistance in said first operating state and a relatively high resistance in said second operating state, said timing cells being configured and arranged so as to change state from said first operating state to said second operating state in response to the application thereto for a known time interval of a current having a first polarity, and further to change state from said second operating state to said first operating state in response to the application thereto of a current having a second polarity opposite to said first polarity;
 (b) means supplying a current of said first polarity to one of said timing cells when said one timing cell is in said first operating state;
 (c) electrical circuit means for detecting when said one timing cell changes state from said first operating state to said second operating state, including means generating an output signal upon detection thereof;
 (d) means operative simultaneously with said detecting means for applying a current of said second polarity to the other timing cell when said other timing cell is in said second operating state, and changing the state of said other timing cell to a first operating state such that said other timing cell has been changed to a first operating state when said one timing cell changes state from said first operating state to said second operating state;
 (e) indicator means responsive to said output signal for indicating to an operator when said one timing cell changes state from said first operating state to said second operating state and hence, when said known time interval has elapsed; and
 (f) means adapted to permit alternating reversal of said pair of timing cells, respectively, between a first connection in said detecting means and a second connection in said applying means.

2. An apparatus of claim 1, including means for varying said known time interval.

3. An apparatus of claim 1, wherein said means adapted to permit reversal of said timing means is adapted so as to permit simultaneous reversal of said timing cells between said first connection in said detecting means and said second connection in said applying means.

4. An apparatus of claim 1, wherein said alarm means includes means responsive to said output signal for providing a visual indication that said known time interval has elapsed.

5. An apparatus of claim 1, including means for preventing larger amplitude voltage spikes from affecting the operation of said applying means.

6. An apparatus of claim 5, wherein said preventing means include a zener diode which is connected in said applying means so that it is parallel with said other timing cell.

7. An apparatus of claim 1, wherein said detecting means includes first and second transistors connected in Darlington with said one timing cell being connected between the emitter and the base of said first transistor, and wherein the emitter-collector circuit of said second transistor is connected intermediate a source of energizing voltage and said alarm means.

8. An elapsed-time reminder circuit, comprising:
 (a) electrolytic timing means having first and second operating states, said timing means having a relatively low resistance in said first operating state and a relatively high resistance in said second operating state, said timing means being configured and arranged so as to change state from said first operating state to said second operating state in response to the application thereto for a known interval of a current having a first polarity and further operative to change state from said second operating state to said first operating state in a response to the application thereto of a current having a second polarity opposite to said first polarity;
 (b) means supplying a current of said first polarity to said timing means when said timing means is in said first operating state;
 (c) electrical circuit means for detecting when said timing means changes state from said first operating state to said second operating state, including means generating an output signal upon detection thereof;
 (d) means applying a current of said second polarity to said timing means when said timing means is in said second operating state, thereby changing the state of said timing means to said first operating state;

(e) indicator means responsive to said output signal for indicating to an operator when said timing means changes state from said first operating state to said second operating state and hence, when said known time interval has elapsed; and (f) means adapted to permit alternate connection of said timing means in said detecting means when said timing means is in said first operating state and in said applying means when said timing means is in said second operating state.

9. An apparatus of claim 8, including means for varying said known time interval.

10. An apparatus of claim 9, wherein said alarm means includes means responsive to said output signal for providing a visual indicator that said known interval of time has elapsed.

11. The apparatus according to claim 9 and wherein said electrolytic timing means are a pair of solid coulometric cell means.

12. The apparatus according to claim 11 and in which said means for permitting alternative connection of said timing means comprises reversible connection for said pair of solid coulometric cell means.

13. The apparatus according to claim 11 and in which said means for permitting alternate connection of said timing means comprises circuit switching means for selectively applying currents of first and second polarity to said timing means.

14. An elapsed-time service indicator for installation in motor vehicles for indicating when servicing of the vehicle is required, comprising:

(a) a pair of electrolytic timing cells, each having first and second operating states, said timing cells having a relatively low resistance in said first operating state and a relatively high resistance in said second operating state, said timing cells being configured and arranged so as to change state from said first operating state to said second operating state in response to the application thereto for a known time interval of a current having a first polarity, and further to change state from said second operating state to said first operating state in response to the application of a current having a second polarity opposite from said first polarity;

(b) battery operated means located in the vehicle for supplying a current of said first polarity to one of said timing cells, when said one timing cell is in said first operating state, said supplying means thus operating substantially only when said motor vehicle is in operation;

(c) electrical circuit means for detecting when said one timing cell changes state from said first operating state to said second operating state in response to application of the current of said first polarity thereto, said electrical circuit means including means generating an output signal upon detection that said one timing cell has changed state from said first operating state to said second operating state;

(d) battery operated means operative simultaneously with said detecting means to apply a current of said second polarity to the other timing cell when said other timing cell is in said second operating state, thereby changing the state of the other timing cell to said first operating state over the time interval said one timing cell is in said first operating state such that said other timing cell is in said first operating state when said one timing cell changes state from said first operating state to said second operating state;

(e) indicator means energized by said output signal for indicating to the operator of the motor vehicle when said one timing cell changes state from said first operating state to said second operating state and hence, when said known time interval has elapsed and servicing of the vehicle is required; and (f) means adapted to permit reversal of said pair of timing cells, respectively, between a first connection in said detecting means and a second connection in said applying means.

* * * * *